United States Patent [19]

Kleinwächter et al.

[11] Patent Number: 5,462,047
[45] Date of Patent: Oct. 31, 1995

[54] SOLAR WATER-HEATER WITH INTEGRATED STORAGE

[75] Inventors: Jürgen Kleinwächter, Kandern; Ulrich Leibfried, Lörrach, both of Germany

[73] Assignee: Klaus Herrmann Aktiengesellschaft, Schwerte, Germany

[21] Appl. No.: 77,776

[22] Filed: Jun. 18, 1993

[30] Foreign Application Priority Data

Jun. 19, 1992 [CH] Switzerland ............. 01933/92

[51] Int. Cl.⁶ ............................................. F24J 2/44
[52] U.S. Cl. ............................................. 126/639; 126/640
[58] Field of Search ............................. 126/640, 638, 126/639

[56] References Cited

U.S. PATENT DOCUMENTS

| | | | |
|---|---|---|---|
| 1,853,480 | 4/1932 | Wheeler et al. | 126/640 X |
| 2,064,345 | 12/1936 | Hodgson | 126/639 |
| 2,213,894 | 9/1940 | Barry | 126/640 X |
| 4,384,568 | 5/1983 | Palmatier | 126/640 X |
| 4,685,445 | 8/1987 | Seidel | 126/639 |

FOREIGN PATENT DOCUMENTS

| | | | |
|---|---|---|---|
| 0257425 | 5/1963 | Australia | 126/639 |
| 0219566 | 4/1987 | European Pat. Off. | |
| 0351220 | 1/1990 | European Pat. Off. | |
| 529163 | 11/1921 | France | |
| 2436945 | 4/1980 | France | |
| 2502759 | 10/1982 | France | |
| 3728551A1 | 3/1989 | Germany | |
| 9109856 | 11/1991 | Germany | |
| 5099545 | 7/1980 | Japan | 126/639 |
| 8088552 | 5/1983 | Japan | 126/639 |
| 59-219653 | 12/1984 | Japan | |
| 60-023755 | 2/1995 | Japan | |
| 0802735 | 2/1981 | U.S.S.R. | 126/640 |
| 1054632 | 11/1983 | U.S.S.R. | 126/639 |
| WO/A8002191 | 10/1980 | WIPO | |

Primary Examiner—Carl D. Price
Attorney, Agent, or Firm—Bacon & Thomas

[57] ABSTRACT

A solar water heater with integrated storage tank can be filled isothermally with water of which the temperature is freely selected and which, when the tank is full, passes into a thermosiphoning mode. A collector and the storage tank are housed compactly in one flat unit and, because of unpressurized operation, allows easy and economical assembly. Two principles of solar hot-water heating are combined in the invention: primarily cold water is raised to the desired final temperature in ONE PASS through the absorber, thereby achieving good collector efficiencies and rapid response; and, when the storage is full, thermosiphoning circulation sets-in automatically and further heats the storage content and/or compensates for heat losses.

13 Claims, 4 Drawing Sheets

SOLAR WATER-HEATER WITH INTEGRATED STORAGE

BACKGROUND OF THE INVENTION

Solar water-heating contributes substantially to the ecology and to saving fossil resources. This presumes well-operating, rugged systems that are as passive as possible, i.e., do not require auxiliary energy inputs. Solar water-heaters with directly affixed storage tanks have been recently the most successful on the market. These known solar water-heater systems essentially constitute thermo-siphon systems, and systems wherein a collector and a storage device form a single unit.

Regarding efficiency, these systems evince the drawback that most of the time they are mixed-storage types wherein the temperature of all the water is raised more or less uniformly in the storage unit by a mixing assembly. However, to be useful as a water-heater, the temperature must always be above a minimum value. If hot water is removed, a corresponding amount of cold water will be added to the hot water. Therefore, the following drawbacks ensue:

relatively high absorber intake temperatures exist and therefore high heat losses are incurred, after the storage unit is completely discharged, hot water will be available only following a relatively time consuming heating stage.

Occasionally layer storage is used in combination with thermo-siphon systems to overcome the aforementioned drawbacks. However such systems are not compact and their manufacture and installation are more expensive. Furthermore, they still evince some temperature balance and hence loss of efficiency.

Another drawback of thermo-siphon equipment is their unsightliness because of superposed and visible tanks. This drawback is circumvented in integrated absorber-tank units (the so-called storage collectors). As a rule, in such storage collectors, the water is held in a well insulated storage unit and is bounded at its surface by an absorber wall. In turn this absorber wall is covered with one or more transparent layers (transparent insulation) toward the sun side. The incident solar radiation heats the absorber wall and this wall, in turn, transfers part of this heat to the storage water below and the remainder through radiation, conduction and convection through the transparent thermal insulation to the ambient.

In this regard a problem is encountered in that, on the one hand, the transparent cover must be highly insulated to prevent intense nocturnal cooling but, on the other hand, it must be highly transparent. Presently available transparent heat insulating materials either strike an unsatisfactory tradeoff, or they are comparatively expensive.

A storage collector solving the problems of excessive tank temperatures is described in European patent Publication No. 219,566 dated Oct. 22, 1985 which discloses a variable-volume storage to which cold water is admitted thermostatically, whereby the water temperatures always remain approximately constant. However the addition of cold water results in unnecessarily high heat losses which are reflected in the storage temperatures.

A storage collector free of the above drawbacks is described in German published patent application 3,728,551.3. In this arrangement, the topological design is nearly identical with a conventional storage collector. The essential difference is that a thermal insulating layer is present between the surface-mounted collector and the integral storage below. Accordingly heat transfer can no longer take place directly through the wall into the storage water, but rather the heat transfer is carded out through a small circulating pump feeding the temperature-gradient water in the tank from the lower colder zone into the absorber from where the water, upon reaching a desired temperature, is fed in laminar flow into the top of the tank.

In spite of its compactness, such a storage collector offers excellent thermal insulation for the storage part and good optical properties for the collector. Nevertheless, it incurs two substantial drawbacks: the assumption of stable temperature layering for rapid availability and low heat losses by the collector is impossible on account of the flat design, and the system cannot operate passively.

SUMMARY OF THE INVENTION

It is an object of the present invention to provide a solar water-heater with integrated storage that eliminates the drawbacks of the above storage collectors and additionally optimizes the way the heated water is stored.

According to the invention, the collector, which is separated by a thermal insulating layer from the storage tank, shall be mounted in such a manner that the absorber intake is located underneath the discharge which passes into the storage tank below the highest point of the storage tank. In the collector, in a single pass through the absorber, the water to be heated is raised directly from the cold-water intake temperature to the final temperature, without further circulation (this is the ONE PASS principle). Thermostatic control without auxiliary energy allows isothermally loading the initially empty storage tank with water of the desired final temperature.

If, however, the storage tank is filled in this manner, the water volumes of the storage tank and the absorber represent a water system communicating at the top and bottom at low flow impedance. In the absorber, the water heated by solar radiation above the storage temperature will rise and thereby generate gravity circulation (thermosiphoning) further heating the storage water or compensating its heat losses. As a result, an excess of solar energy can be further stored by temperature increases. Moreover, cooling in the hot water tank upon lengthy lack-of-use will be avoided.

Further objects, features and advantages of the invention will be more readily apparent from the following detailed description of the invention when taken in conjunction with the drawings wherein like reference numerals refer to corresponding parts in the several views.

DETAILED DESCRIPTION OF THE INVENTION

According to the invention, a storage tank is isothermally filled at a selected temperature with water that was heated in ONE pass through an absorber. Heat is stored by an increase in volume or weight of the storage medium (water) until the storage tank has been filled, and, upon further solar radiation, thermosiphoning takes place and heat is stored by increasing the storage-water temperature.

The combination of these two operations offers the following substantial advantages over conventional storage collectors or thermosiphoning systems while simultaneously preserving simple, compact design and without resort to extraneous energy:

isothermal storage-loading at a freely selected temperature, rapid system response even after short irradiation, good collector efficiency on account of low intake-temperature, lesser heat losses in the storage tank than when storing the same amount of heat by raising the temperature (the losses are approximately proportional to the temperature difference with the ambient, neglecting radiation, but ⅔ proportional to the volume). This applies especially to a variable-volume storage, as discussed more fully hereinafter, such that the storage unit may be made larger than in conventional solar systems so as to enable it to effectively store more heat.

Figure 1:
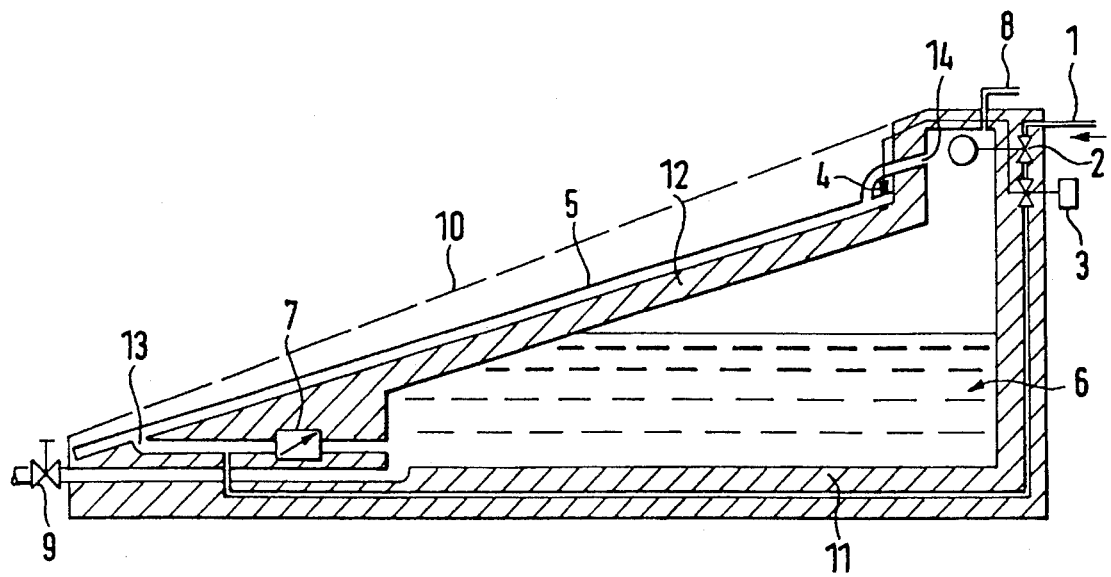
FIG. 1 depicts a schematic, cross-sectional view of a first preferred embodiment of the invention.

Reference will now be made to FIG. 1 which shows a preferred embodiment of the storage unit according to the present invention. Cold water passes through the water intake (cold water supply) 1 into the unit and is made to pass through a water level control-valve 2 and a thermostatically controlled cooling valve 3 before entering absorber 5 located underneath a transparent cover 10. The absorber 5 is mounted in such a way that the level of the absorber intake 13 is lower than the level of the discharge 14 and the discharge 14 passes into tank 6 of the storage unit below the highest point of the storage unit. A sensor 4 of a thermostatic control system for the storage unit is mounted adjacent the absorber discharge 14. Sensed signals from sensor 4 is used to control the position of cooling valve 3. This thermostatic control arrangement throttles the pressure and thereby the water flow in such a manner that the desired temperature, whether rigidly predetermined or adjustable, is precisely obtained at the absorber discharge 14. In this manner, tank 6 is loaded with water of nearly constant temperature.

When tank 6 is full, whereby its water level is at least as high as the absorber discharge 14, the level control-valve 2 will close (for instance by a float of a float-valve being raised to shut off this valve). At this point, since the water in tank 6 communicates with the water in the absorber 5 at the top through the absorber discharge 14 and at the bottom through a backflow stop 7 (for example a conventional check valve assembly), thermosiphoning may now take place.

The backflow stop 7 prevents cold water from directly entering the storage tank 6 and, when tank 6 is full and also when absorber 5 is cooling during the night, further prevents circulation in the opposite direction.

A vent 8 is mounted at the very top of tank 6 and ensures that gases leaving the water will be evacuated and that, upon filling or emptying tank 6, air is free to escape or enter tank 6. Tank 6, as well as the underside of the absorber 5, is insulated as indicated at 11. Hot water can be withdrawn from tank 6 through an outlet 9 mounted at the lowest point of the tank.

Figure 2:
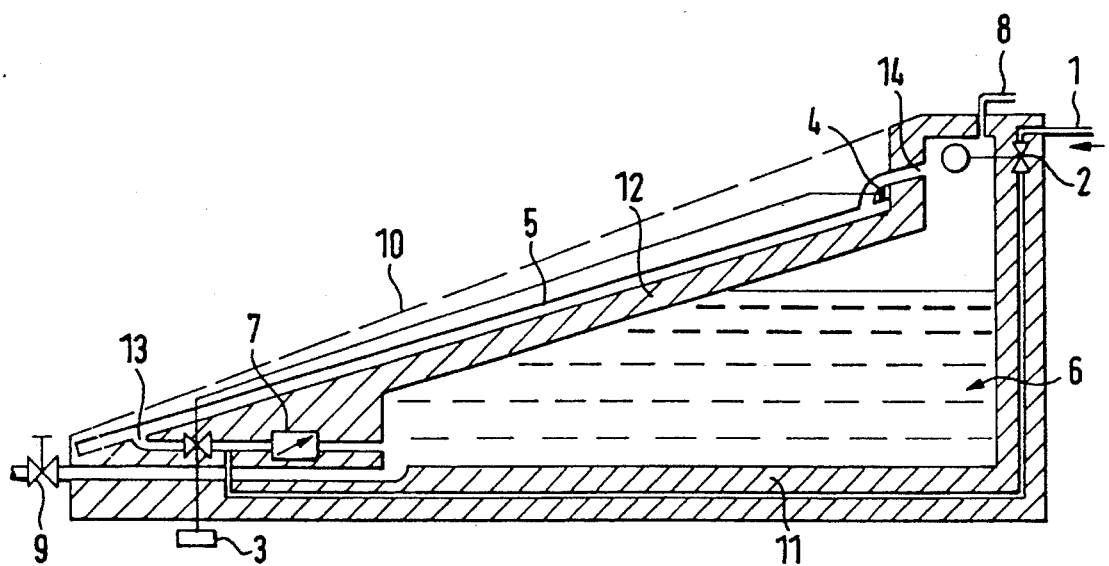
FIG. 2 depicts a schematic, cross-sectional view of a second preferred embodiment of the invention.

FIG. 2 shows an embodiment variation of the invention wherein thermostatic valve 3 is located directly in front of the absorber intake 13 in a communication conduit between the storage tank 6 and absorber 5. As a result, the backflow stop 7 is pressurized and operates better as a sealing means during filling of tank 6.

Figure 3:
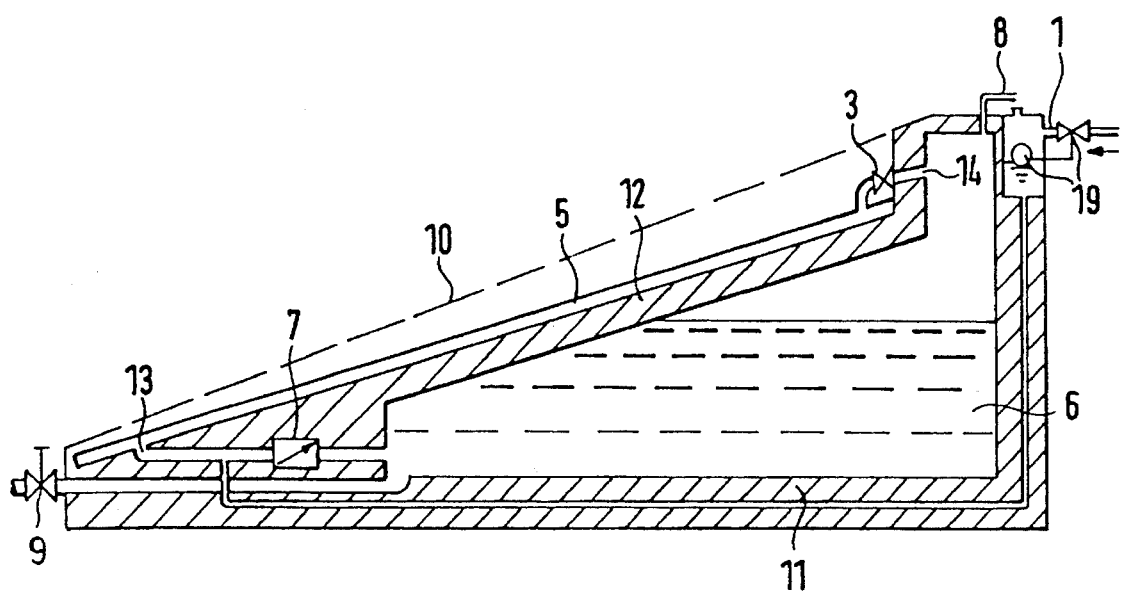
FIG. 3 depicts a schematic, cross-sectional view of a third preferred embodiment of the invention.

Another variation is shown in FIG. 3. In this embodiment, the thermostatic valve 3 is mounted in the absorber discharge 14. Accordingly, economical valves with internal sensors may be used. This presumes either a pressure-resistant absorber 5 or pressure reduction at the water intake 1. If the pressure reduction is implemented by a level control 19 as shown in FIG. 3, to always keep the water level below the vent level 8, then a level control installed within tank 6 will not be needed. The preceding level control also may be in the form of a float valve present in an upwardly open volume of water.

Figure 4:
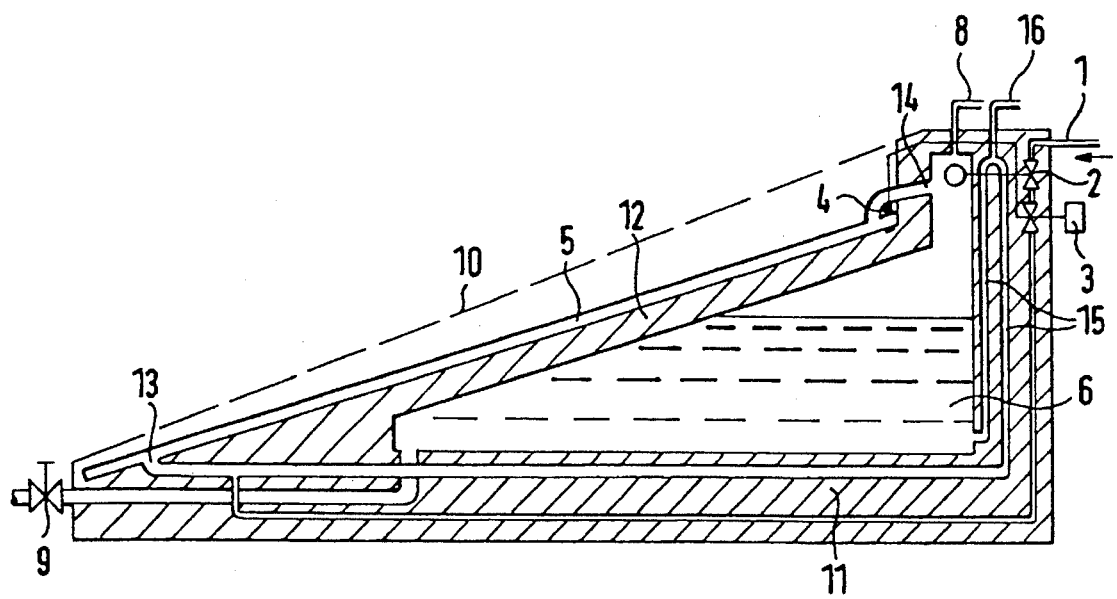
FIG. 4 depicts a schematic, cross-sectional view of a fourth preferred embodiment of the invention.

FIG. 4 shows another variation wherein, instead of a backflow stop 7, an overflow conduit 15 is fitted with a vent 16 and located between the tank 6 and the intake 1. Overflow passage 15 extends above absorber discharge 14 and below the switching level of the level control and, with vent 16, is able to prevent cold water from directly flowing into tank 6. This design however will not prevent nocturnal circulation-reversal and longer communication lines are generally necessary which results in a loss of pressure.

Figure 5:
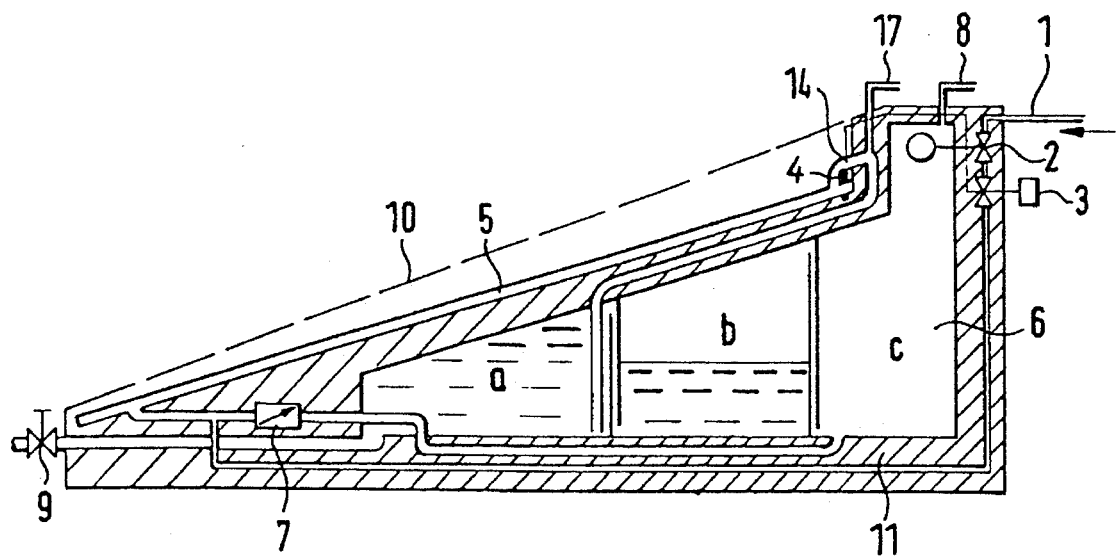
FIG. 5 depicts a schematic, cross-sectional view of a fifth preferred embodiment of the invention.

A variable tank volume approximately corresponding to the degree of filling may be achieved to reduce heat losses from the storage unit when partly loaded. For instance:

(a) horizontal division of tank 6 into two or more sub-tanks a–c (see FIG. 5) wherein a siphoning system provides that the tanks a–c will be filled in the sequence (a), (b), (c) . . . and shall be emptied in the reverse sequence. Hook-up to the absorber intake is at the last tank (c).

Figure 6:
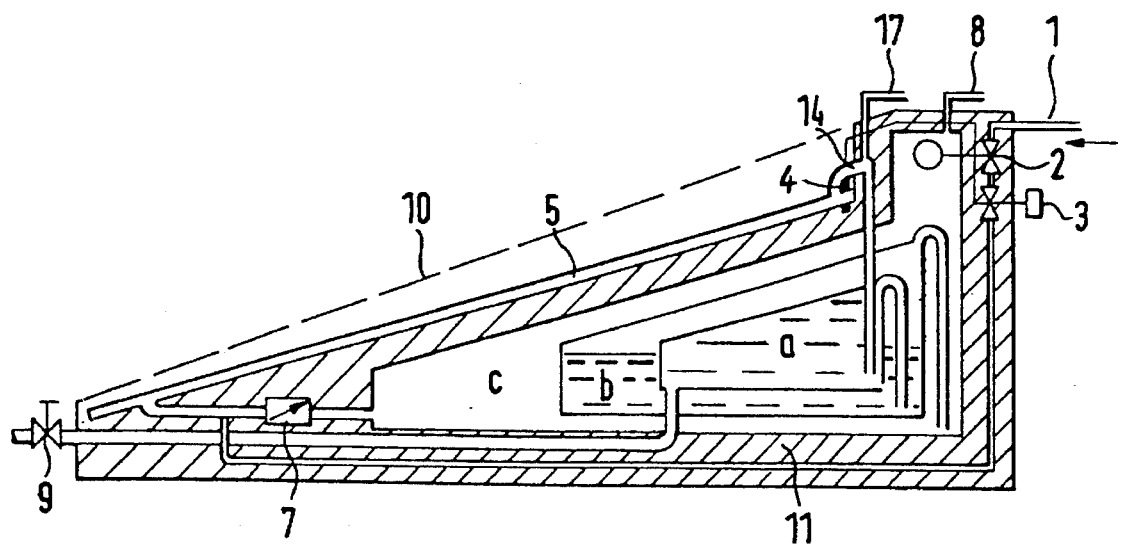
FIG. 6 depicts a schematic, cross-sectional view of a sixth preferred embodiment of the invention.

(b) a desirable effect is achieved by nesting sub-tanks a–c (FIG. 6) wherein, as a result, tank shapes with better volume-to-surface ratios may be achieved inside, for instance spheres and, again, the hookup to the absorber intake is at the last tank (c), (c) an inflatable pouch-like tank that inflates when being filled and collapses when being emptied also meets the solution of the invention of a variably matched tank volume. According to this embodiment, the level control is desirably stationary as in the first embodiment of the invention.

Figure 7:
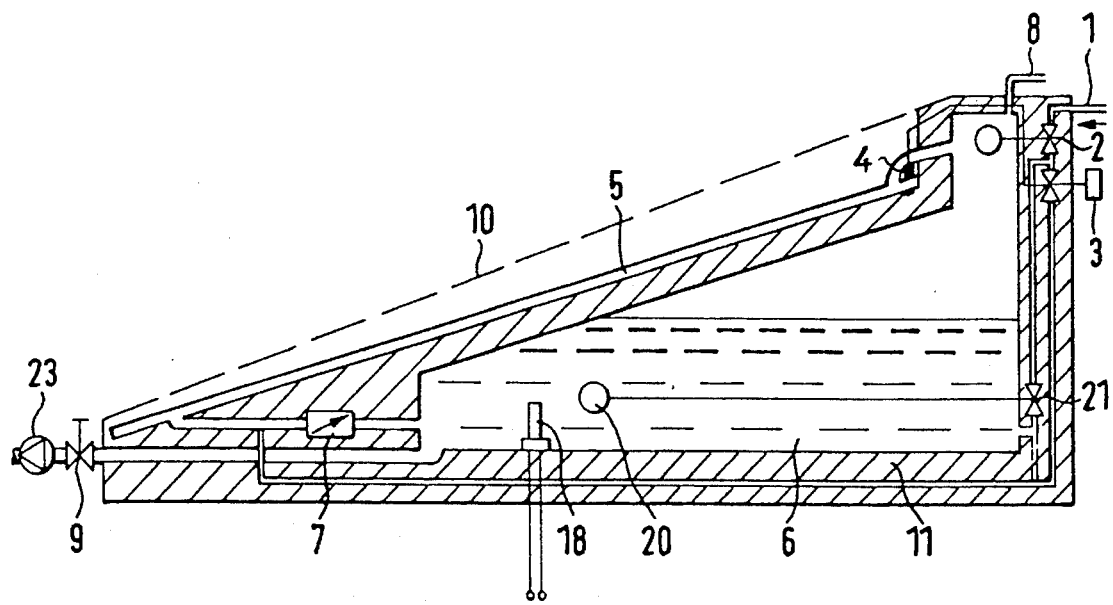
FIG. 7 depicts a schematic, cross-sectional view of a seventh preferred embodiment of the invention.

Post-heating the water in the case of insufficient solar radiation can be carried out as follows according to the present invention:

(a) Electrical post-heating a minimum volume remaining in the tank (FIG. 7). If the water in tank 6 drops below a given level, then the level control 2 will open a valve (for instance a float valve) to admit cold water directly, or, after it passes through absorber 5 as shown by the dashed conduit in FIG. 7, into the tank 6. An electrical, thermostatically controlled heating element 18 is inserted into this minimum volume of water and prevents the water in the tank from ever dropping below a minimum temperature. However, the electrical heating element 18 also may be replaced by another heat source such as a heat exchanger. Of course, the above-mentioned minimum volume is dependent upon the size of one or more of the above described tank chambers.

(b) A preferably thermostatically controlled in-line heater 25 mounted behind water-discharge 9 or a conventional hot-water tank 26 post-heats the water to the desired final temperature. A level-monitor 20 mounted in tank 6 ensures that when the tank 6 is empty, cold water can flow directly from the cold-water intake 1 of FIG. 7 to the hot-water discharge 9 in FIG. 7, i.e., that it can bypass booster pump 23. Accordingly there is no reduction in pressure and in this operating mode, for instance during winter months, no drive power is demanded by the pump even with pressurized hot-water systems.

Figure 8:
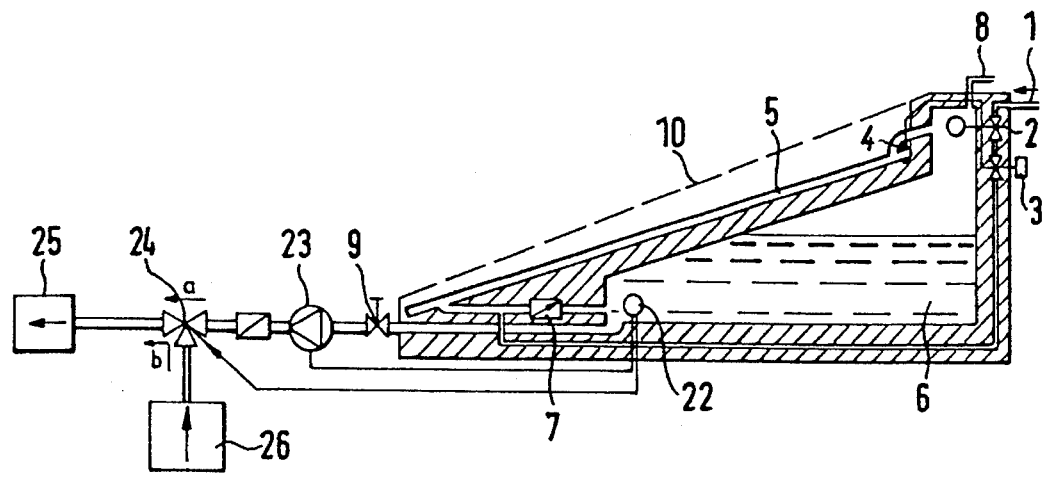
FIG. 8 depicts a schematic, cross-sectional view of an eighth preferred embodiment of the invention.

(c) FIG. 8 shows another way to hook-up to a second, perhaps conventional, hot-water tank 26. A level monitor 22 emits switching signals to a three-way cock valve 24, to a booster pump 23 and to the conventional water heater 26. When tank 6 of the solar water heater is other than empty, cock valve 24 is positioned to permit flow in the direction of arrow a. When the tank is empty, booster pump 23 is shut off and cock valve 24 is positioned to permit flow in the direction of arrow b and the conventional water heater is used.

In principle, the entire apparatus may be mounted at an angle to the horizontal. In that case the components must be designed for higher pressures and the level monitor as well as the backflow stop must be installed so as to accommodate operation in this slanted condition. In the case of heating a minimum volume remaining in the tank, the level sensor 20 of FIG. 7 must be mounted in the front region of the tank so that the desired minimum volume shall also be present in the slanted position.

Because the invention lowers the water pressure directly after hookup to a water main, no subsequent component needs be designed for a pressure higher than the water column in the collector. This design feature offers cost advantages arising from lower wall thicknesses and consequent savings in material. Moreover other materials may be used, for instance plastics, offering freedom from corrosion and low net weight.

When the invention is carried out in sunbelts such as southern Europe or Africa, the lack of pressure in many cases will not be a drawback because, in such southern lands, water storage often is located on the roofs and determines the line pressure also by the height above the user. As regards the households in which the line pressure of the water mains is higher, an additional pump behind the solar collector may provide for miscibility with the cold water.

The integrated heat storage of the invention in combination with its low weight allows problem-free moving to a use site. The costs of connecting the absorber to the heat storage are minimized. The insulation of absorber and hot-water storage may be used simultaneously by both assemblies, allowing lower costs and losses and less bulk as compared to separate systems.

Although described with respect to preferred embodiments of the invention, it should be recognized that various changes and/or modifications may be made without departing from the spirit of the invention. In general, the invention is only intended to be limited by the scope of the following claims.

We claim:

1. A solar water heater comprising:

a thermally insulated storage tank (6);

an absorber (5) integrated as a unit with said storage tank and arranged to receive solar energy, said absorber, for the purpose of enabling a flow of water therethrough to which solar heat collected by the absorber can be transferred, having an associated absorber intake (13) an absorber discharge (14) wherein the absorber intake is positioned lower than said absorber discharge, said absorber intake communicating with said storage tank and said absorber discharge opening into said storage tank below the highest point of said storage tank;

a thermally insulated layer (12) interposed between said storage tank and said absorber;

a thermostatically controlled cold-water supply means (1) including a cold water inlet and means for directly communicating said cold-water inlet with said absorber intake, said communicating means including a level-control means to control the level of water in said storage tank, a plurality of flow valves (2,3) for controlling the supply of cold water and a thermostatic control-sensor means for regulating the position of at least one of said plurality of flow valves, said communicating means controlling the flow of water such that a predetermined temperature is attained at the absorber discharge, the cold water entering said absorber through said absorber intake is heated on one pass through said absorber and said storage tank is filled isothermally with hot water being expelled from said absorber through said absorber discharge, said storage tank, together with said absorber, constituting a fully communicating water system with low flow impedance and wherein, upon solar irradiation, thermosiphoning occurs in a circulating manner to further heat the water in said storage tank in order to compensate for heat losses from the system.

2. A solar water heater as claimed in claim 1, wherein said plurality flow valves includes a thermostatically controlled cooling valve (3) downstream of the cold water inlet of the cold-water supply means; and wherein said thermostatic control-sensor means (4) is mounted in the vicinity of the absorber discharge for controlling the positioning of said cooling valve in order to throttle the water pressure and control the flow of water such that the predetermined temperature is attained at the absorber discharge (14);

said solar water heater further comprising:

a backflow stop (7) preventing both cold water from directly entering the storage tank (6) and back-circulation from the absorber (5), in case it is cooled, into the storage tank (6);

a level-control valve located in series with the cooling valve for interrupting further cold-water supply when the storage tank is full and communicating with the water in the absorber at a top thereof through the absorber discharge and at a bottom through said backflow stop (7);

a hot water discharge (9) located at a lowermost portion of said storage tank; and a vent (8) located at the highest point of said storage tank to allow evacuate gases leaving the water and air to escape or enter when filling takes place through the absorber (5) or when emptying takes place through said hot-water discharge (9).

3. A solar water heater as claimed in claim 2, wherein said thermostatically controlled cooling valve (3) is mounted immediately downstream of the absorber intake (13) in-line between the storage tank (6) and the absorber (5), whereby the backflow stop (7) is pressurized and assures improved sealing during filling of the storage tank (6).

4. A solar water heater as claimed in claim 2, wherein said thermostatically controlled valve (3) is mounted in the absorber discharge (14).

5. A solar water heater as claimed in claim 2, further comprising:

at least one of an in-line heater and a conventional hot-water tank located downstream of the hot-water discharge (9) to heat the water to a desired temperature;

level monitor means (22) provided in the storage tank (6); and a booster pump located downstream of said hot water discharge, said level monitor means ensuring that, in case of empty storage, cold water shall arrive directly from the cold water supply means (1) to at least one of the hot water discharge (9) and the booster pump (23), in which case no pressure reduction will take place.

6. A solar water heater as claimed in claim 5, wherein at least one of the hot-water discharge (9) and the booster pump (23) is connected through a three-way cock valve (24) to a second hot-water heater, and said level monitor means (22) emits switching signals to at least the three-way cock valve (24) such that, when the storage tank (6) is full, the cock valve controls the water flow out of the storage tank (6) and into a hot-water circuit, and if storage tank (6) is empty, the cock valve shuts off the booster pump, fluidly connects the second water heater to feed water into the hot-water circuit and initiates operation of the second water heater.

7. A solar water heater as claimed in claim 2, wherein the solar water heater is mounted in a sloping manner.

8. A solar water heater as claimed in claim 2, further comprising a booster pump (23) located downstream of the hot-water discharge (9) to pressurize the hot water that flows from said hot water discharge.

9. A solar water heater as claimed in claim 1, wherein said level control means (2) comprises a pressure-reducing means (19) mounted at the cold-water supply means (1), said level control means functioning to keep the water level below a venting level.

10. A solar water heater as claimed in claim 1, further comprising an overflow passage (15), fitted with a vent (16), extending above the absorber discharge (14) and below a switching level of the level control means (2), whereby cold water is prevented from directly flowing into the storage tank.

11. A solar water heater as claimed in claim 1, wherein the absorber discharge (14) is fitted with a vent (17) and the storage tank (6) is divided into at least two tanks (a, b . . . ) sharing common base and communicating by a siphoning means such that the at least two tanks are sequentially filled, emptied in reverse order and return flow is from the last filled tank to the absorber (5).

12. A solar water heater as claimed in claim 1, wherein the absorber discharge (14) is fitted with a vent (17) and the storage tank (6) is divided into at least two mutually nesting tanks (a, b . . . ) which communicate through siphoning means such that the tanks (a, b . . . ) are sequentially filled, emptied in reverse order and return flow is from the last filled tank to the absorber (5).

13. A solar water heater as claimed in claim 1, further comprising:

a valve (21) located in a branch of the cold water supply means (1) that is in fluid communication with said storage tank;

a second level control means (20) located in the storage tank (6) for opening said valve (21) when the water in the storage tank has dropped below a specified low level to supply water to the storage tank; and a thermostatically controlled heat source (18) for keeping the water temperature in the storage tank (6) at a given value.

* * * * *